(12) United States Patent
Sandhu et al.

(10) Patent No.: US 9,766,121 B2
(45) Date of Patent: Sep. 19, 2017

(54) MOBILE DEVICE BASED ULTRA-VIOLET (UV) RADIATION SENSING

(71) Applicant: Intel Corporation, Santa Clara, CA (US)

(72) Inventors: Sumeet Sandhu, Santa Clara, CA (US); Hossein Alavi, Portland, OR (US); Ehud Reshef, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 13/630,661

(22) Filed: Sep. 28, 2012

(65) Prior Publication Data

US 2014/0092238 A1    Apr. 3, 2014

(51) Int. Cl.
| | | |
|---|---|---|
| *H04N 7/18* | (2006.01) | |
| *G01J 1/02* | (2006.01) | |
| *G01J 1/42* | (2006.01) | |
| *G01J 1/04* | (2006.01) | |
| *G01J 1/16* | (2006.01) | |
| *G01J 1/50* | (2006.01) | |

(52) U.S. Cl.
CPC ............ *G01J 1/0271* (2013.01); *G01J 1/0219* (2013.01); *G01J 1/0233* (2013.01); *G01J 1/0403* (2013.01); *G01J 1/0488* (2013.01); *G01J 1/1626* (2013.01); *G01J 1/429* (2013.01); *G01J 1/4228* (2013.01); *G01J 1/50* (2013.01); *G01J 2001/0257* (2013.01)

(58) Field of Classification Search
None
See application file for complete search history.

(56) References Cited

U.S. PATENT DOCUMENTS

| 5,548,661 | A | * | 8/1996 | Price ................... G01N 15/147 |
| | | | | 348/80 |
| 5,927,603 | A | * | 7/1999 | McNabb ....................... 239/63 |
| 6,426,503 | B1 | | 7/2002 | Wuest |
| 6,452,188 | B1 | * | 9/2002 | Chubb ......................... 250/372 |
| 7,526,280 | B2 | | 4/2009 | Jung et al. |

(Continued)

FOREIGN PATENT DOCUMENTS

| JP | 2006-349625 | 12/2006 |
| JP | 3133260 | 7/2007 |

(Continued)

OTHER PUBLICATIONS

Machine level English translation of KR20070000259A.*

(Continued)

*Primary Examiner* — Mohammad J Rahman
(74) *Attorney, Agent, or Firm* — Schwegman Lundberg & Woessner, P.A.

(57) ABSTRACT

The present application discloses device and system embodiments that address mobile device integration considerations for various categories of UV sensors, including cameras, photodiodes, and chemical sensors. The UV sensors may use the functionalities of the existing in-built sensors in conventional mobile devices, and/or integrate additional components specific to UV sensing. By optimally positioning the sensors, UV sensing and other collateral functionalities (e.g., charging a photovoltaic cell integrated with the mobile device) can be realized in parallel.

24 Claims, 4 Drawing Sheets

(56) References Cited

U.S. PATENT DOCUMENTS

| | | | |
|---|---|---|---|
| 8,275,413 B1* | 9/2012 | Fraden | H04M 1/72522 455/344 |
| 8,368,035 B2* | 2/2013 | Seibel | G01N 21/4795 250/461.2 |
| 8,760,494 B1* | 6/2014 | Twede | H04N 9/43 250/370.11 |
| 9,042,967 B2* | 5/2015 | Dacosta | A61B 5/0059 600/476 |
| 9,235,733 B2* | 1/2016 | Birdwell | G06K 5/00 |
| 2003/0134668 A1* | 7/2003 | Mekuria | 455/572 |
| 2004/0027474 A1* | 2/2004 | Aoyama et al. | 348/335 |
| 2004/0078219 A1 | 4/2004 | Kaylor et al. | |
| 2005/0275839 A1* | 12/2005 | Robinson | G01J 3/2803 356/318 |
| 2005/0288038 A1 | 12/2005 | Kim | |
| 2006/0054782 A1* | 3/2006 | Olsen et al. | 250/208.1 |
| 2006/0181776 A1* | 8/2006 | Sandhu | 359/618 |
| 2007/0004449 A1 | 1/2007 | Sham | |
| 2007/0108389 A1* | 5/2007 | Makela et al. | 250/372 |
| 2008/0029708 A1* | 2/2008 | Olsen | G02B 7/04 250/372 |
| 2009/0091621 A1* | 4/2009 | Chen | H04N 9/045 348/162 |
| 2011/0261355 A1* | 10/2011 | Hannel et al. | 356/303 |
| 2012/0085932 A1* | 4/2012 | Themelis | G01J 3/2823 250/459.1 |
| 2012/0254633 A1* | 10/2012 | Vilhauer et al. | 713/300 |
| 2012/0267511 A1* | 10/2012 | Kozlowski | 250/208.1 |
| 2013/0194459 A1* | 8/2013 | Kanemitsu | G06T 7/0085 348/241 |
| 2013/0206962 A1* | 8/2013 | Barr et al. | 250/208.1 |
| 2013/0286236 A1* | 10/2013 | Mankowski | 348/222.1 |
| 2013/0322711 A1* | 12/2013 | Schultz et al. | 382/128 |
| 2013/0327671 A1* | 12/2013 | Ciurczak | G01J 3/0262 206/459.5 |
| 2014/0056172 A1* | 2/2014 | Lee et al. | 370/254 |

FOREIGN PATENT DOCUMENTS

| | | |
|---|---|---|
| KR | 10-0722974 | 5/2007 |
| KR | 10-2010-0134926 | 12/2010 |

OTHER PUBLICATIONS

International Search Report/Written Opinion, mail date Oct. 11, 2013, PCT/ISA/210, PCT/ISA/220, and PCT/ISA/237, total of 13 pages.
Fahrni et al., Sundroid: Solar Radiation Awareness with Smartphones, UbiComp'11, Sep. 17-21, 2011, total of 10 pages.
Zenith Transmission Diffusers, Pro-Lite Technology, http://www.pro-lite.co.uk/File/Zenith_Transmission_Diffusers.php, total of 2 pages.
Ultraviolet, from Wikipedia, the free encyclopedia, http://en.wikipedia.org/wiki/Ultraviolet, total of 30 pages.
TrendHunter Tech, 14 Sun Safety Accessories, http://www.trendhunter.com/slideshow/sun-safety-accessories, total of 13 pages.
DoCoMo Goes Crazy with BMI, UV, Breath Analyzer and Radiation Detection Smartphone 'Jackets', http://www.mobilemag.com/2011/10/10/docomo-goes-crazy-with-bmi-uv-breath-analyzer-and-radiation-detection-smartphone-jackets, total of 3 pages.
EPA UV Index, http://www.epa.gov/enviro/mobile, total of one page.
Libelium, Libelium World, Articles: Sensor Networks to protect people from Ultraviolet Radiation in the summer, Jun. 30, 2010, http://www.libelium.com/libeliumworld/articles/101811811515, total of 5 pages.
Ultraviolet photography, from Wikipedia, the free encyclopedia, http://en.wikipedia.org/wiki/Ultraviolet_photography, total of 4 pages.
AnandTech—Apple iPhone 4S: Thoroughly Reviewed, http://www.anandtech.com/show/4971/apple-iphone-45-review-att-verizon/11, total of 8 pages.
MIT Media Lab, Camera Culture, http://www.media.mit.edu/research/groups/camera-culture, total of 4 pages.
LAPIS Semiconductor, UV Sensor ML8511, http://www.lapis-semi.com/en/semicon/sensor/m18511.html, total of 3 pages.
Digitimes Supply Chain Window, DTF 2012 Ultra Mobile & Ecosystem Forum, Developments and trends of optical sensor technology and mobile product applications, http://www.digitimes.com/supply_chain_window/story.asp?datepublish=2012/07/10&pages=VL&seq=202, total of 4 pages.
Gurunandan Krishnan et al., Towards a True Spherical Camera, SPIE Digital Library, Feb. 16, 2010, http://spiedl.org/terms, SPIE-IS&T/vol. 7240, total of 13 pages.
CAVE, True Spherical Camera, http://www.cs.columbia,edu/CAVE/projects/sphercam, total of 2 pages.
UV Penetration and Plastic, Ask a scientist, DOE Office of Science, http://www.newton.dep.anl.gov/askkasci/eng99/eng99272.htm, total of 4 pages.
Fused quartz, from Wikipedia, the free encyclopedia, http://en.wikipedia.org/wiki/Fused_quartz, total of 6 pages.
MedGadget, Ultraviolet Dosimeter Wristbands to Help Prevent Overexposure to Sunlight, Aug. 13, 2012, http://www.medgadget.com, total of 6 pages.
Point Grey 360 Spherical Vision Camera Systems, http://www.ptgrey.com/products/spherical.asp, total of 2 pages.

\* cited by examiner

MOBILE DEVICE BASED ULTRA-VIOLET (UV) RADIATION SENSING

TECHNICAL FIELD

This disclosure relates generally to the field of use of mobile devices for situational awareness applications, such as ultra-violet (UV) radiation sensing. Specifically, the disclosure relates to UV sensing components integrated with mobile devices.

BACKGROUND

UV radiation sensing has various applications in diverse fields, such as health monitoring and healthcare, forensic sciences, security and authentication, environmental hazard detection and/or purification, antique evaluation and restoration etc. In imaging applications UV wavelengths let surface artifacts appear in greater clarity, and allow visualization of smaller features than those which can be seen using visible light. In case of health monitoring and care, it is well known that while a moderate amount of UV exposure is beneficial, as UV radiation helps in production of vitamin D, melanin etc., overexposure to UV radiation can potentially cause health problems, starting from erythema (redness of skin, indicating skin damage) to severe health hazards, such as skin cancer, genetic mutations etc. Medical data shows that skin cancer caused by UV from sunlight is one of the most prevalent forms of cancer in the United States and worldwide. Therefore, there is a clear need for UV exposure meters.

Various commercial UV sensors are available currently. A popular form of UV exposure meter comprises sensors mounted on wearable accessories, such as wrist/arm bands, watches, belts, jewelry, clothing etc. UV sensors may comprise photodiodes, photocathodes, and/or photomultipliers. Each sensor may measure a portion of the UV spectrum such as UVA, UVB, or UVC, or some combination of them. Sensor readings from multiple sensors may be fused to mimic the erythema action curve, or detect when they are greater than the minimum erythema dose. The UV sensor may have a Teflon diffuser to emulate the ideal cosine response expected when human skin is exposed to UV radiation at various angles of incidence. Some examples of these sensor configurations can be found in an article, titled, "Sundroid: Solar Radiation Awareness with Smartphones," by Fahrni et al., presented in UbiComp, 2011 conference, which is incorporated herein by reference. Smartphone/mobile device accessories, such as, add-on device jackets with UV sensors, have also been introduced recently. These accessories communicate UV measurement data to mobile devices like smartphones, tablets, notebooks, laptops etc. for further processing of data, displaying the results to the user, and/or receiving user input or input from other devices.

The state-of-the-art UV sensors are typically not integrated well into the internal circuitry of the mobile devices like smartphones, tablets etc. However, there are smartphone/tablet applications ("apps") providing access to wide-area UV data maintained by government organizations (such as the Environmental Protection Agency (EPA)). These data are obtained from large scale fixed UV sensors deployed for agricultural sector and/or weather prediction which may also be broadcast via public media. While this solution is useful, it has certain drawbacks. Because the sensors are non-local, if the user is unable to access the internet, data related to personal safety (such as data indicating UV overexposure) will not be accessible. This is a fundamental limitation of non-local sensors. Furthermore, it is difficult to have real-time, accurate local UV measurement data with non-local sensors. In other words, as information is not local in nature, and specifically does not relate to the user of the mobile device, any "alert" that is generated would have to be generic and may not relate to the actual UV radiation user is exposed to.

As mobile devices like smartphones become the device of choice not just for communications and data consumption, but also for photography and health and fitness monitoring, it makes sense to integrate local sensors or cameras for detection of UV radiation into the mobile devices. Some existing references, such as U.S. Pat. No. 7,526,280, entitled "Service implementing method and apparatus based on an ultraviolet index in a mobile terminal," focus on using smartphones for UV detection service, but do not provide any detail of how the mobile device physically integrates the sensing mechanism with other system components.

DETAILED DESCRIPTION

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is an electronic device and system for UV radiation detection and processing. UV sensing can be used in various applications, including security, forensics, lighting (e.g., fluorescent lamps), therapy (e.g., photochemotherapy, phototherapy), pest control, pet care (e.g., aquarium light), scientific analysis of materials (e.g., spectrophotometry; chemical marker), environmental purification, sanitary compliance, electronic manufacturing (e.g., photolithography, epoxy curing, manufacturing UV solar cells), food processing, safety detection (e.g., fire detection), non-destructive testing and re-use of components (e.g., erasing current data from non-volatile memory). The present detailed description section discloses integration of UV sensors in smartphones or other similar portable electronic devices (such as, personal digital assistant, electronic book reader, laptop computer, notebook computer, smart cameras, personal multimedia players, personal entertainment consoles etc.). Since these devices are carried by users for communication, entertainment, computing, information gathering, electronic transaction or other purposes anyway, additional functional integration, such as UV sensing to the existing electronic devices makes sense as an alternative to having to carry a separate gadget only for UV-sensing. By way of example, the present patent application describes how portable electronic devices with integrated UV sensor measure UV radiation to mitigate overexposure risks, which may include aesthetic and/or health issues, such as blemishes, skin damages, skin cancer etc.

As described in the background section, publicly available UV measurement data can be accessed by communicating with a remote server (such as EPA server). However, compared to the delayed, averaged, wide area measurement data obtained from public resources, data obtained from local sensors integrated with mobile devices are likely to be much more accurate and faster.

Placement of the sensor on the mobile device is not a trivial task as the sensor must be sufficiently exposed to sunlight for UV sensing. The mobile device itself may be carried in a pocket, purse, or be otherwise partially occluded. Therefore sensors need to be placed to enhance the possibility of collecting at least some amount of sunlight even when the mobile device is not held in the most advantageous position for UV sensing. Angle of incidence of sunlight is another vital factor in sensing. Sensitivity to angle of incidence of direct sunlight onto the sensor has been characterized in literature, such as the Sundroid article by Fahrni et al, mentioned in the "background" section. In a typical scenario, total UV exposure is a sum of direct sunlight UV and reflections from the local environment. Ideally, the UV sensor needs to receive direct and reflected sunlight irrespective of the position or orientation of the device. Especially in a configuration, where sensor is placed locally rather than distributed on the body of the mobile device, sensor positioning in conjunction with special light capturing lenses, such as wide angle, spherical or rotatable lenses (as will be elaborated further below) becomes important. The light capturing lenses may be specifically tailored for UV spectrum.

The present application discloses device and system embodiments that address mobile device integration considerations for various categories of UV sensors, including cameras, photodiodes, and chemical sensors. The UV sensors may use the functionalities of the existing in-built sensors in conventional mobile devices, and/or integrate additional components specific to UV sensing.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

In an aspect of the present disclosure, built-in existing sensors in the mobile devices can be used to detect UV radiation from sunlight. Some high-end mobile devices already have sensors for wavelength bands beyond the visible light band to enhance the situational awareness functionality of smart mobile devices. For example, infrared sensors (IR sensors) may be integrated with mobile devices as a proximity sensor. However, for integrating UV sensors into smart mobile devices, some special considerations need to be addressed.

If the UV sensors are to be housed inside enclosures, the enclosures or at least a portion thereof must be transparent at critical UVA, UVB, UVC wavelength bands that can potentially cause harm. Non-limiting examples of transparent glasses include quartz or silica glass. Non-limiting examples of transparent plastics include pure Plexiglass ("PMMA", poly-methyl-meth-acrylate), Poly-ethylene, DuPont's Teflon™, wax-paper, mineral oil trapped between multiple sheets of plastic, etc. A UV camera to be integrated with smart mobile device need to use UV transparent quartz lens, as regular glass blocks most of the harmful UV radiation.

Figure 1:
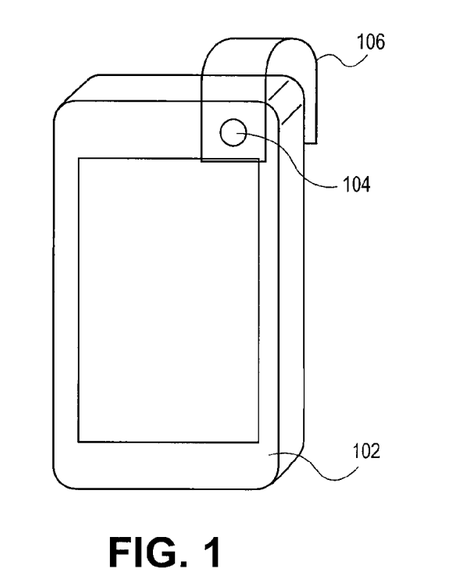
FIG. 1 depicts an example embodiment of the present disclosure where an UV filter works in conjunction with existing visible light sensing camera in a mobile device.

FIG. 1 shows a first embodiment where a mobile device 102 has a built-in camera 104. By covering the camera lens with a special UV bandpass optical component 106 that filters out all visible light and passes only the UV band, required input for UV exposure measurement can be generated. The optical component 106 may be an accessory that can be slid on/off the camera lens, as shown in FIG. 1. Alternatively, the optical component may be a retractable shutter that can cover the camera lens when a mechanical switch is activated manually, and/or when the mobile device automatically detects that the device is outdoors, or the user indicates a need for UV exposure monitoring. UV bandpass optical component 106 may be calibrated to follow the ideal cosine curve relating angle of incidence to generated response.

To match the generated response to a reference curve, an appropriate diffuser (such as a Teflon diffuser) may be incorporated into the design of the component 106. In other words, the bandpass optical component 106 may have a UV filter and a diffuser. For example, the generated response of the component 106 can be correlated with the sensitivity of known erythema action curve (such as described in U.S. Pat. No. 6,426,503) that simulates the critical exposure levels that affect human skin, when an appropriate diffuser is included in the component 106. Persons skilled in the art would understand that though erythema response is used as an illustrative case of target response, other types of targeted responses may also be obtained based on the sensor components and calibration.

To elaborate on the calibration of data to follow a certain response, it is to be understood that the cosine angular sensitivity of detected UV radiation refers to skin absorption. If N number of rays of incident waves with intensity $E_i$ ($i=1, 2, \ldots, N$) and incident angles of $a_i$ fall on the skin, the total skin absorption is given by: $E=\Sigma E_i \cos a_i$. A photodiode may be integrated with the camera as a UV sensor. However, since a photodiode current doesn't follow this cosine response, a cosine diffuser needs to be used in front of the sensor to calibrate the measurement. A diffuser by nature is not transparent and cannot be put in front of a camera while capturing images, because image will be blurred as well. Therefore, a diffuser included in the component 106 can slide in front of the camera when required, and can be removed when the camera is capturing images.

Rather than using the UV bandpass optical component 106 while capturing sunlight, the UV filtering can be done at a later stage during electronic/optoelectronic post-processing. Removing the need for an external optical component increases light capturing efficiency of a regular camera lens.

In an embodiment, an on/off switch may control whether a physical UV filtering optical filter and/or a diffuser should be used to send only UV light for UV-specific data processing, calibration, or, whether the spectral separation would be carried out in a later digital post-processing stage in a UV processing module.

Figure 2A:
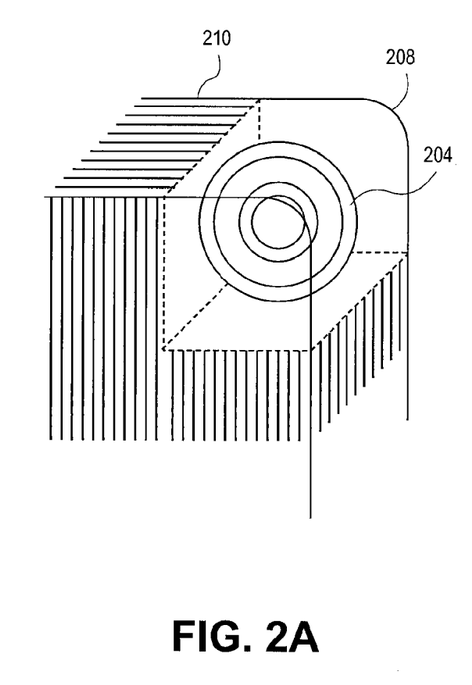
FIGS. 2A-2B depict an example embodiment of the present disclosure where one or more rotating cameras are integrated with a mobile device for enhanced angular adjustment required for accurate UV radiation sensing.
Figure 2B:
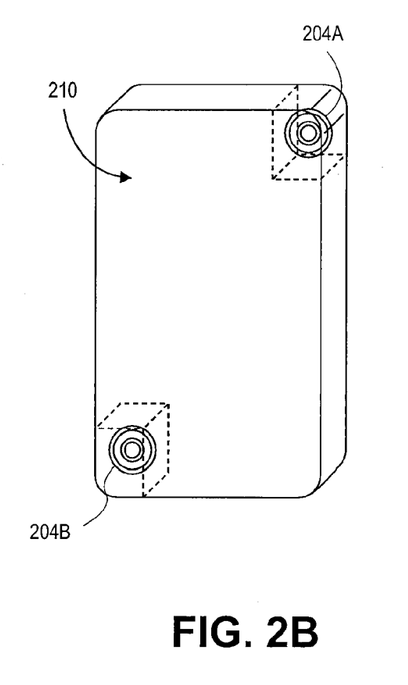

FIGS. 2A-2B show how the placement of the camera 204 may facilitate UV sensing. A UV transparent enclosure 208 may be designed at the corner of the housing 210 of a mobile device. The design of the transparent enclosure facilitates in reflected UV radiation being captured by the camera in addition to direct sunlight incident on the camera. The camera 204 may be mounted mechanically in a way that allows rotational degrees of freedom. For example, the camera may be a rotating camera with 270 degree rotational capability. Rotating cameras enhances the camera's ability to capture sunlight at various angles and also capture reflected sunlight. FIG. 2B shows that there may be multiple rotating cameras (e.g., 204A and 204B) at various corners of the mobile device.

In some embodiments, instead of using a rotating camera, a spherical camera may be used to avoid moving parts. Non-limiting examples of spherical cameras include cameras offered by PointGrey Research Inc., which can procure image data for more than 80% of a 360 degree spherical field of view with appropriate software for data processing.

Figure 3:
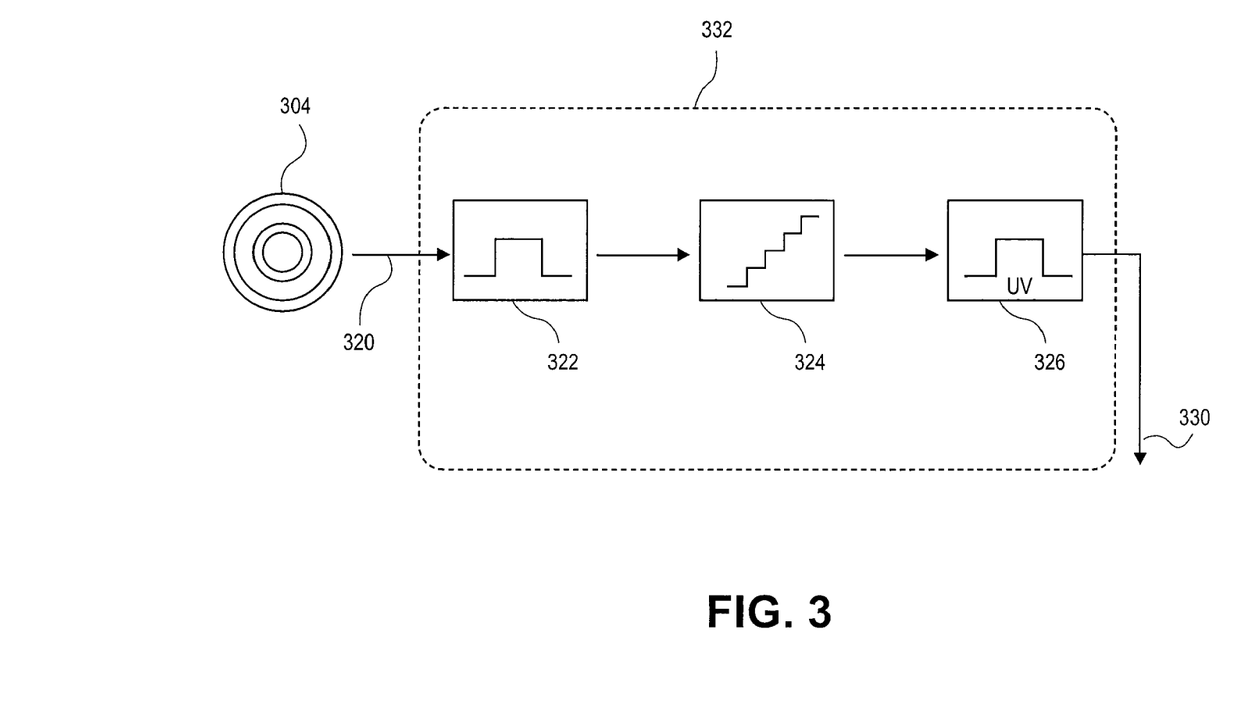
FIG. 3 depicts a high-level functional block diagram of an UV measurement data processing unit, in accordance with various aspects of the present disclosure.

FIG. 3 shows an example UV processing circuit 332 which receives analog signal 320 from a camera 304. Persons skilled in the art would appreciate that even a single rotating camera may generate positional data related to various angular positions. Though FIG. 3 shows input analog signal 320 from a single camera, the circuit 332 may be enabled to fuse UV data from multiple cameras in one mobile device (such as the example shown in FIG. 2B) or multiple cameras in multiple mobile devices. Similar to data fusion used in 3D image capture with multiple cameras, 3D UV sensing would require a signal processing mechanism accounting for relative position of the plurality of cameras involved. Accuracy of UV measurement can be enhanced when data from multiple sensors (e.g., multiple cameras) are taken into account.

UV processing circuit 332 may have an analog filter 322, a digitizer module 324 that converts the filtered analog signal to digital signal, and an UV bandpass filter 326, that separates UV data from the rest of the spectral components captured by the camera 304 to extract UV measurement raw data 330. The raw data 330 is then processed further, and UV exposure level is determined by comparing with known data. Appropriate graphical indications may be presented to the user to make him/her aware whether the UV radiation level is safe, unsafe, or reaching towards an unsafe threshold.

Persons skilled in the will appreciate in view of the present disclosure that an important aspect regarding UV exposure may not just be the exposure to current/instantaneous UV radiation levels, but an overall (integrative) radiation level over a specific temporal window, and the processing circuit in FIG. 3 may have integration modules (not specifically shown).

Figure 4:
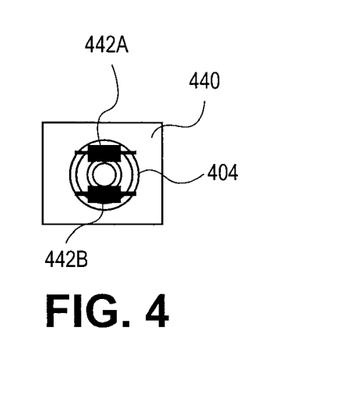
FIG. 4 depicts a camera with in-situ UV photodiode(s), in accordance with example embodiments of the present disclosure.
Figure 5:
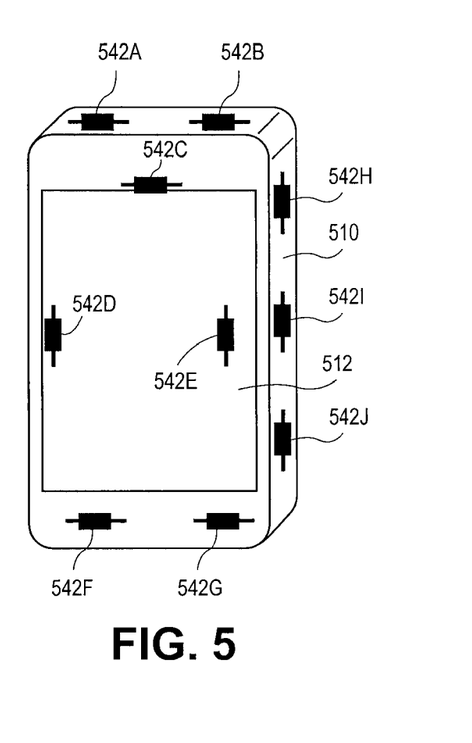
FIG. 5 depicts a mobile device with distributed UV photodiode(s), in accordance with example embodiments of the present disclosure.

For maximum angular exposure, the UV sensors should be integrated at the edges or sides of the device. FIGS. 4 and 5 show embodiments where UV photodiodes close to the edge/surface of mobile devices are used as UV sensors. UV photodiodes output a current proportional to received UV radiation. Use of UV photodiodes as integrated circuit UV dosimeters has been described in U.S. Pat. No. 6,426,503. However, this reference does not teach how the photodiodes are integrated with the housing of a mobile device. The present disclosure describes example embodiments where the discrete photodiodes are attached to or soldered to other housing components of the mobile device. Alternatively, the housing and the photodiodes may be co-manufactured if designed accordingly. The general idea is to place the photodiodes on or near the exposed surfaces of the mobile device so that angular exposure to sunlight is maximized.

In the example embodiment shown in FIG. 4, the photodiodes may be integrated with another chip that is aligned with the camera edge to take advantage of the specially designed transparent glass enclosure 440 that redirects reflected UV light to the camera lens. Even if the camera is not used as a UV sensor, the glass enclosure is useful for the UV photodiodes. Alternatively, both the camera and the UV photodiodes are used as UV sensors.

In other embodiments, the photodiodes may be integrated with other components of the phone close to the surface, such as an RF antenna or touchscreen, which are disposed on or near the external surface of a mobile device. For example, in FIG. 5, photodiodes 542D and 542E is mounted on the touchscreen 512. Photodiodes 542A, B, H, I and J are mounted along the side of the housing 510 of the mobile device, and photodiodes 542C, F and G are mounted on the front of the housing 510 of the mobile device. A distribution of a plurality of photodiodes can be useful rather than a photodiode only in a specific location to ensure that adequate amount of sunlight is captured even when the mobile device is held at an arbitrary position.

In addition to or instead of placing the photodiodes along the external surface of a mobile device, photodiode sensors may be integrated with a core system-on-chip (SoC) included in the internal circuitry of the mobile device. Placing photodiodes only on the SoC may be an economic solution, because standard semiconductor manufacturing techniques may be used to integrate the photodiodes with the SoC, though it may pose constraints on design of the housing, because the SoC needs to be aligned to an UV transparent window, or internal optical components may be necessary to direct light onto the photodiode integrated with the SoC. Also footprint of the SoC itself may become larger. Integration of the sensor in the SoC would require the die to be enclosed in a UV transparent package. In an embodiment, a cosine diffusing material may be used for the package itself, and/or or a window on the package.

Figure 6A:
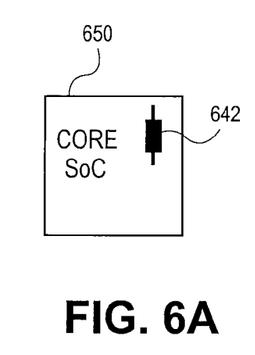
FIGS. 6A-6B show two embodiments according to the present disclosure, one with a photodiode integrated with the core system-on-chip (SoC) of the device, and another with a photodiode external to the core SoC, but in communication with the core SoC.
Figure 6B:
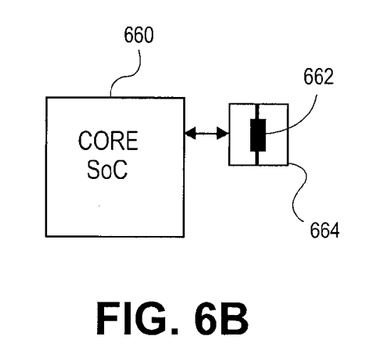

In some embodiments, the SoC may be part of a core processing or computing unit of UV-sensing-enabled mobile electronic device 102, and is configured to receive and process input data and instructions, provide output and/or control other components of device 102 in accordance with embodiments of the present disclosure. Such a SoC is referred to as core SoC, examples of which are shown in FIGS. 6A (element 650) and 6B (element 660). The SoC may include a microprocessor, a memory controller, a memory and other components. The microprocessor may further include a cache memory (e.g., SRAM), which along with the memory of the SoC may be part of a memory hierarchy to store instructions and data. The microprocessor may also include one or more logic modules such as a field programmable gate array (FPGA) or other logic array. Communication between the SoC microprocessor and memory may be facilitated by the memory controller (or chipset), which may also facilitate communication with other peripheral components. The advantage of putting photodiode 642 in the core SoC 650 itself (as shown in FIG. 6A) is that UV data processing can be accomplished locally at the core SoC at a very fast speed. A tradeoff associated with die-level proximity of photodiodes is additional integration considerations during design and manufacture of the die itself. In an alternative configuration, as shown in FIG. 6B, the photodiode 662 may be part of a separate chip 664, which communicates with core SoC 660.

As understood by persons skilled in the art, the UV data processing functionality can be easily integrated with the computational and storage (memory) elements already existing in a smart mobile device. The memory of UV-sensing-enabled electronic device 102 may be a dynamic storage device coupled to the bus infrastructure and configured to store information, instructions, and programs, to be executed by processors of the SoC and/or other processors (or controllers) associated with device 102. It is to be noted that on-board DRAM memory integrated as System In Package (SIP) with the core SoC is typical in mobile devices, in contrast to existing PC architecture. Device 102 may also include read only memory (ROM) and/or other static storage devices coupled to the bus infrastructure and configured to store static information and instructions for processors of SoC and/or other processors (or controllers) associated with device 102.

Figure 7A:
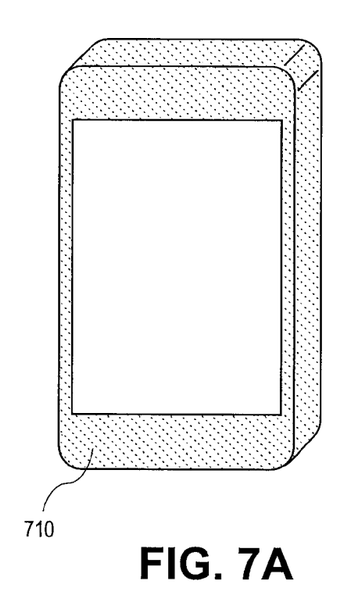
FIGS. 7A-7B depict two example embodiments using UV sensitive chemical sensors, according to the present disclosure.

While the above discussed embodiments focused on collection of UV light and processing of UV data using discrete UV sensors (e.g., modified cameras or photodiodes), another type of distributed UV sensor is envisioned by the present disclosure based on UV sensitive chemical sensors. This aspect of the disclosure is particularly suited for providing a clear visual indication of UV exposure level. Chemical sensor based mobile UV detection may be implemented by coating the housing of a mobile device with UV sensitive chemicals that change color prominently in response to UV absorption. As shown in FIG. 7A, at least portions of the side, back and front part (excluding the display area) of the housing 710 of a mobile device can be made to be sensitive to UV radiation. Examples of UV sensitive materials include, but not limited to, dyes that change color prominently in response to pH level change due to acid-release agents in the dye reacting to UV radiation. If the housing comprises 'electronic smart skin' type material, then in addition to the qualitative visual indication of color change, an input may be provided to the mobile device's UV processing circuitry, so that quantified results are presented to the user on the display screen. A warning message may also be displayed if unsafe exposure levels are determined.

Persons skilled in the art will appreciate that the quantified results may be presented in graphical form (e.g., color bars/histograms etc. with or without numerical data) in a user-friendly manner. For example, overexposure may be indicated as 'red', when safe exposure may be indicated as 'green', while intermediate color codes indicating various levels of exposure so that the user may make an informed decision. Also, an audio alert may be built into some embodiments.

Figure 7B:
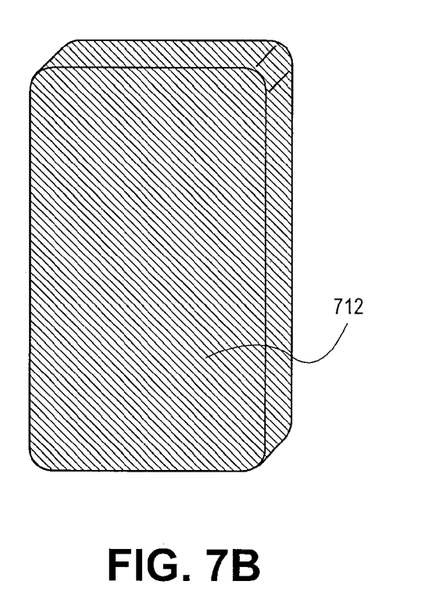

FIG. 7B shows the back surface of a mobile device with a jacket/sleeve 712 that is made of and/or coated with an UV sensitive material. The jacket/sleeve changes colors when UV triggers chemical reactions in the jacket/sleeve. Malleable polymer skins used commonly as a protective external skin in conventional mobile devices such as smartphones can be treated with UV sensitive materials for enhanced functionalities. This may potentially be the one of the most economic ways of integrating basic UV sensing to mobile devices. However, if the same protective skin needs to be reused (rather than being disposed off after one or a few times of use), then the chemical changes need to be temporary/reversible.

For more sophisticated sensing, data processing and information presentation, the UV sensitive housing/jacket may be combined with other UV sensing mechanisms, such as, cameras, UV photodiodes etc., as discussed above in the present disclosure.

It is to be noted that UV detection with smartphones would be most effective when the sensors are exposed to the environment in which the UV radiation is being measured. If a user is indoors, UV detection may not be very essential except for reflected UV. Even when the user himself/herself is outdoors, if the smartphone is inside a pocket, purse or other enclosure, and local measurement by an individual smartphone may not be able to provide accurate data. When an enclosure is detected (for example, by comparing actual readings to what is expected based on the time of day and/or historical data at or near the detected location, or by estimating visible light received) a smartphone may be enabled to find alternative data sources, such as the data from the internet and/or from other UV sensors detected within a local environment. A detachable miniature UV sensing module with Bluetooth connectivity to the smartphone is an example of external UV sensor that can be used for improving UV measurement accuracy when the smartphone itself is occluded. The miniature module may be detached from the smartphone and temporarily mounted on hats, sunglasses, or other wearable items to collect UV data.

It will be rather apparent to those skilled in the art after reading this detailed disclosure that the foregoing detailed disclosure is intended to be presented by way of example only and is not limiting. For example, though the disclosure often mentions health monitoring as the illustrative area of application, UV sensors and associated circuitry discussed herein may be applicable in others areas, including, but not limited to, security, forensics, astronomy, pest control, sanitary compliance, air/water purification, authentication, chemical markers, fire detection, reading illegible papyri and manuscripts, etc. Having local UV radiation measurement/awareness can be utilized as input to build smart buildings, smart cars etc. For example, if excess UV radiation level is detected, 'smart windows' in smart buildings and/or smart cars may be activated automatically to improve overall wellness of the occupants. This may be done by activating a UV-absorbing screen/shade.

Some of the applications, such as UV photography, security, forensics, lighting, therapy, pest control, scientific analysis of materials (e.g., spectrophotometry; chemical marker), environmental purification, non-destructive testing etc. may require UV radiation as well as sensing. Though the present disclosure primarily elaborates examples with integrated UV sensors, certain embodiments can include both UV radiation source and UV sensors integrated with the smart mobile devices. Examples of UV radiation sources include UV lamp and/or flash.

A further embodiment may include a localized UV sensor block where the device casing/housing is built in such a way as to funnel the UV radiation to the UV detector/photodiode, for example, by use of optical fiber/micro mirrors, etc.

In one embodiment, it is possible to harvest UV energy to charge the electronic device using a specialized photovoltaic cell/sensor that will simultaneously charge the device battery while indicating UV specific exposure levels. For example, by optically funneling UV energy to an UV specific sensor/cell and the rest of the light energy to a different region of the mobile device containing a photovoltaic cell, a dual voltage charger/sensor may be created. The photovoltaic cell may be used to charge a battery of the mobile device. In an embodiment, standard photovoltaic cells may be interlaced with UV-specific sensors. When it is expected that a user of the mobile device would optimally position the device to capture solar radiation, then both the UV detection feature and solar charging feature would be benefited.

Various alterations, improvements, and modifications of the systems and embodiments may occur and are intended for those skilled in the art, though not expressly stated herein. These alterations, improvements, and modifications are intended to be suggested by this disclosure, and are within the spirit and scope of the exemplary aspects of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of method, processing elements, or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the appended claims are hereby expressly incorporated into this detailed description.

What is claimed is:

1. A mobile electronic device comprising:
   a transparent enclosure integrated with and disposed at an edge of a housing of the mobile electronic device;
   a camera enclosed by the transparent enclosure, such that light passing through the transparent enclosure is captured by the camera;
   a UV bandpass optical component fitted onto the transparent enclosure;
   a processing unit configured to receive an analog signal representing the light captured by the camera, the processing unit including a UV bandpass filter module; and
   a switch to select either the UV bandpass optical component or the UV bandpass filter module, such that
   if the UV bandpass optical component is selected, the UV bandpass optical component is configured to filter out an-ultra-violet (UV) spectral component from the light and pass only the UV spectral component to be captured by the camera and
   if the UV bandpass optical component is selected, the UV bandpass optical component is configured to separate, in the processing unit, the UV spectral component from the light captured by the camera,
   wherein the processing unit is configured to process the UV spectral component based on known data to produce UV measurement data indicative of a UV exposure level.

2. The mobile electronic device of claim 1, wherein a lens of the camera comprises material transparent to UV wavelength.

3. The mobile electronic device of claim 1, wherein the transparent enclosure comprises material transparent to UV wavelength.

4. The mobile electronic device of claim 1, wherein the device further comprises:
   a retractable diffuser that can be coupled with the camera to generate a targeted shape of UV response curve.

5. The mobile electronic device of claim 1, wherein the camera is mounted mechanically to allow rotational degrees of freedom.

6. The mobile electronic device of claim 1, wherein the camera comprises a spherical camera enabled to capture angular image spanning 360 degree or a portion thereof.

7. The mobile electronic device of claim 1, wherein the device further comprises a UV radiation source.

8. The mobile electronic device of claim 1, wherein the device further comprises:
   a second transparent enclosure integrated with and disposed at a second edge of the housing of the mobile electronic device;
   a second camera enclosed by the second transparent enclosure, such that light passing through the second transparent enclosure is captured by the second camera, the light including a ultra-violet (UV) spectral component.

9. The mobile electronic device of claim 8, wherein the processing unit is to produce the UV measurement data indicative of the UV exposure level by fusing signals received from both the cameras.

10. The mobile electronic device of claim 1, wherein one or more UV photodiodes are aligned to the camera within the transparent enclosure.

11. The mobile electronic device of claim 1, wherein one or more UV photodiodes are disposed on the housing.

12. The mobile electronic device of claim 1, wherein one or more UV photodiodes are integrated with a SoC of the device.

13. The mobile electronic device of claim 12, wherein the SoC is aligned to a UV transparent window included in the housing of the mobile electronic device.

14. The mobile electronic device of claim 12, wherein the UV transparent window includes a removable diffuser to generate a targeted UV response.

15. The mobile electronic device of claim 12, wherein the SoC is packaged in a UV transparent material.

16. The mobile electronic device of claim 1, wherein one or more UV photodiodes are integrated on a die separate from a core SoC of the device, but in communication with the core SoC of the device.

17. The mobile electronic device of claim 1, wherein the housing of the device is coated with an UV-sensitive chemical which changes color prominently when UV exposure level is beyond a certain threshold.

18. The mobile electronic device of claim 1, wherein an alert is generated when UV exposure level is beyond a certain threshold.

19. The mobile electronic device of claim 18, wherein the alert comprise an audio alert, a visual alert, or an audio-visual alert presented to the user by using one or more existing peripherals of the electronic device.

20. The mobile electronic device of claim 1, wherein the light includes multiple UV spectral components, the UV spectral components are channeled towards UV sensors while the rest of the spectral components are channeled to a second sensor.

21. The mobile electronic device of claim 20, wherein the second sensor comprises a photovoltaic cell.

22. The mobile electronic device of claim 21, wherein the photovoltaic cell is configured to charge a battery included in the mobile electronic device.

23. The mobile electronic device of claim 1, wherein the transparent enclosure and the camera are contained within a detachable module that is configured to mechanically fit with the housing of the device, such that the detachable module is at least partially physically separated from the mobile electronic device and disposed at a location advantageous to UV data collection when the mobile electronic device itself is occluded from UV radiation.

24. The mobile electronic device of claim 23, wherein the detachable module maintains a wired or wireless connectivity with the mobile electronic device when being at least partially physically separated from the mobile electronic device.

* * * * *